United States Patent
Behzadi et al.

(10) Patent No.: US 8,131,751 B1
(45) Date of Patent: Mar. 6, 2012

(54) ALGORITHMS FOR SELECTING SUBSEQUENCES

(75) Inventors: Behshad Behzadi, Zurich (CH); Yaniv Bernstein, Zurich (CH); Stefan Burkhardt, Bach (CH); Monika H. Henzinger, Attalens (CH); Benjamin Liebald, Zurich (CH); Richard Tucker, Zurich (CH)

(73) Assignee: Google Inc., Mountain View, CA (US)

( * ) Notice: Subject to any disclaimer, the term of this patent is extended or adjusted under 35 U.S.C. 154(b) by 547 days.

(21) Appl. No.: 12/327,368

(22) Filed: Dec. 3, 2008

Related U.S. Application Data

(60) Provisional application No. 61/022,243, filed on Jan. 18, 2008.

(51) Int. Cl.
*G06F 17/30* (2006.01)

(52) U.S. Cl. ....................................................... 707/769

(58) Field of Classification Search .................. 707/609, 707/705, 765, 769, 791, 802
See application file for complete search history.

(56) References Cited

U.S. PATENT DOCUMENTS

| | | | |
|---|---|---|---|
| 6,119,124 A * | 9/2000 | Broder et al. ................ 1/1 |
| 6,615,209 B1 | 9/2003 | Gomes et al. | |
| 6,658,423 B1 | 12/2003 | Pugh et al. | |
| 7,366,718 B1 | 4/2008 | Pugh et al. | |
| 7,707,157 B1 | 4/2010 | Shen | |
| 7,711,679 B2 | 5/2010 | Patterson | |
| 7,779,002 B1 | 8/2010 | Gomes et al. | |
| 8,015,162 B2 | 9/2011 | Henzinger | |
| 2008/0288509 A1 | 11/2008 | Mysen et al. | |

OTHER PUBLICATIONS

Duval et al., Covering a circular string with substrings of fixed length, May 1995, 7 pages Manber, U., "Finding similar files in a large file System," Oct. 1993, 11 pages.

Broder et al., "Syntactic clustering of the web," Jul. 25, 1997, 13 pages.

Schleimer et al., "Winnowing: local algorthms for document fingerprinting," 2003, 10 pages.

Bernstein et al., "Accurate Discovery of CO-Derivative Documents via Duplicate Text Detection," 2005, 15 pages.

Cole to al., "Deterministic coin tossing and accelerating cascades: Micro and macro techniques for designing parallel algorithms," 1986 14 pages.

Sahlnap et al., "Locally Consistent Parsing and Application to Approximate String Comparisons," Jan. 31, 2006, 2 pages.

Bentley et al., "Data compression using long common substrings," 1999, 9 pages.

* cited by examiner

*Primary Examiner* — Fred I Ehichioya

(74) *Attorney, Agent, or Firm* — Fish & Richardson P.C.

(57) ABSTRACT

The present disclosure includes, among other things, systems, methods and program products for selecting subsequences (shingles or tuples) generated from sequences of tokens.

34 Claims, 6 Drawing Sheets

ALGORITHMS FOR SELECTING SUBSEQUENCES

CROSS-REFERENCE TO RELATED APPLICATIONS

This application claims priority to pending U.S. Provisional Application Ser. No. 61/022,243, filed Jan. 18, 2008, the entire contents of which are hereby incorporated by reference.

BACKGROUND

Selecting subsequences from a sequence of tokens can be used for comparing sequences to determine if two documents are duplicates, for example. The tokens typically are sequences of one or more characters, words, other symbols (e.g., words). However, some existing approaches of selecting subsequences are inefficient for storing and processing redundant information of substantially overlapped subsequences. Some existing approaches are incapable of simultaneously selecting the same subsequences across different sequences of tokens while guaranteeing full coverage by the subsequences selected.

SUMMARY

In general, one aspect of the subject matter described in this specification can be implemented in a method that includes selecting shingles of k tokens from a sequence of tokens using extreme values. The sequence of tokens can be parsed into shingles of k tokens. A set of shingles of k tokens can be selected from the shingles parsed from the sequence, where one of the scenarios exists: (i) one of the first token and the last token in each shingle of the set has the largest value in each shingle; or (ii) one of the first token and the last token in each shingle of the set has the smallest value in each shingle. The set of shingles selected from the shingles parsed from the sequence can be compared with another set of shingles. The another set of shingles can be selected from the shingles parsed from another sequence of tokens in the same way as described above in selecting the set of shingles. Other implementations of this aspect include corresponding systems, apparatus, and computer program products.

A further aspect of the subject matter described in this specification can be implemented in a method that includes selecting shingles of k tokens from a sequence of tokens using tokens' numerical values modulo k. The sequence of tokens can be parsed into shingles of k tokens. A set of shingles of k tokens can be elected from the shingles of k tokens parsed from the sequence, where a numerical value of at least one token in a shingle of the set modulo k corresponds to its position in the shingle of the set. The set of shingles selected from the shingles parsed from the sequence can be compared with another set of shingles. The another set of shingles can be selected from the shingles parsed from another sequence of tokens in the same way as described above in selecting the set of shingles. Other implementations of this aspect include corresponding systems, apparatus, and computer program products.

A further aspect of this subject matter described in this specification can be implemented in a method that includes selecting shingles of k tokens from a sequence of tokens using shingles of m tokens. The sequence of tokens can be parsed into shingles of k tokens, where each of the tokens in the sequence has a value from a set of numerical values. A group S of one or more shingles of m tokens can be selected where each token of each shingle in the group S has a value from the set of numerical values. An offset in reference to a starting position of a shingle of k tokens can be selected. Then a set of shingles of k tokens can be selected from the shingles of k tokens parsed from the first sequence, where one of the scenarios exists: (i) a shingle of m tokens starting at the offset o in a shingle of k tokens in the set is in the group S; or (ii) no shingle of m tokens in a shingle of k tokens in the set is in the group S. The set of shingles selected from the shingles parsed from the sequence can be compared with another set of shingles. The another set of shingles can be selected from the shingles parsed from another sequence of tokens in the same way as described above in selecting the set of shingles. Other implementations of this aspect include corresponding systems, apparatus, and computer program products.

These and other implementations can optionally include one or more of the following features. Each token in a sequence can be a letter, a character, a word, or a string. A numerical value of each token can be a number modulo k. One sequence to be compared with another sequence received can be selected from a data store. Optionally, sequences to be compared can be respective portions of one longer sequence. Similarity of the sequences to be compared can be evaluated by using the value of k and a number of shingles in one set that match shingles in another set.

Particular implementations of the subject matter described in this specification can be implemented to realize one or more of the following advantages. The selection algorithms described in this specification can select shingles parsed from sequences by using extreme token values, token values modulo k as well as token positions, and segments of shingles. The shingles selected by the selection algorithms can be used to find exact matches because two desirable features of exact matching can be achieved, i.e., "consistency" and "coverage." The shingles can also be used in finding approximate matches, e.g., Hamming or other edit distance applications. Various applications of the shingles are also possible, e.g., document similarity determination or detection, biological database comparison, or compression algorithms.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
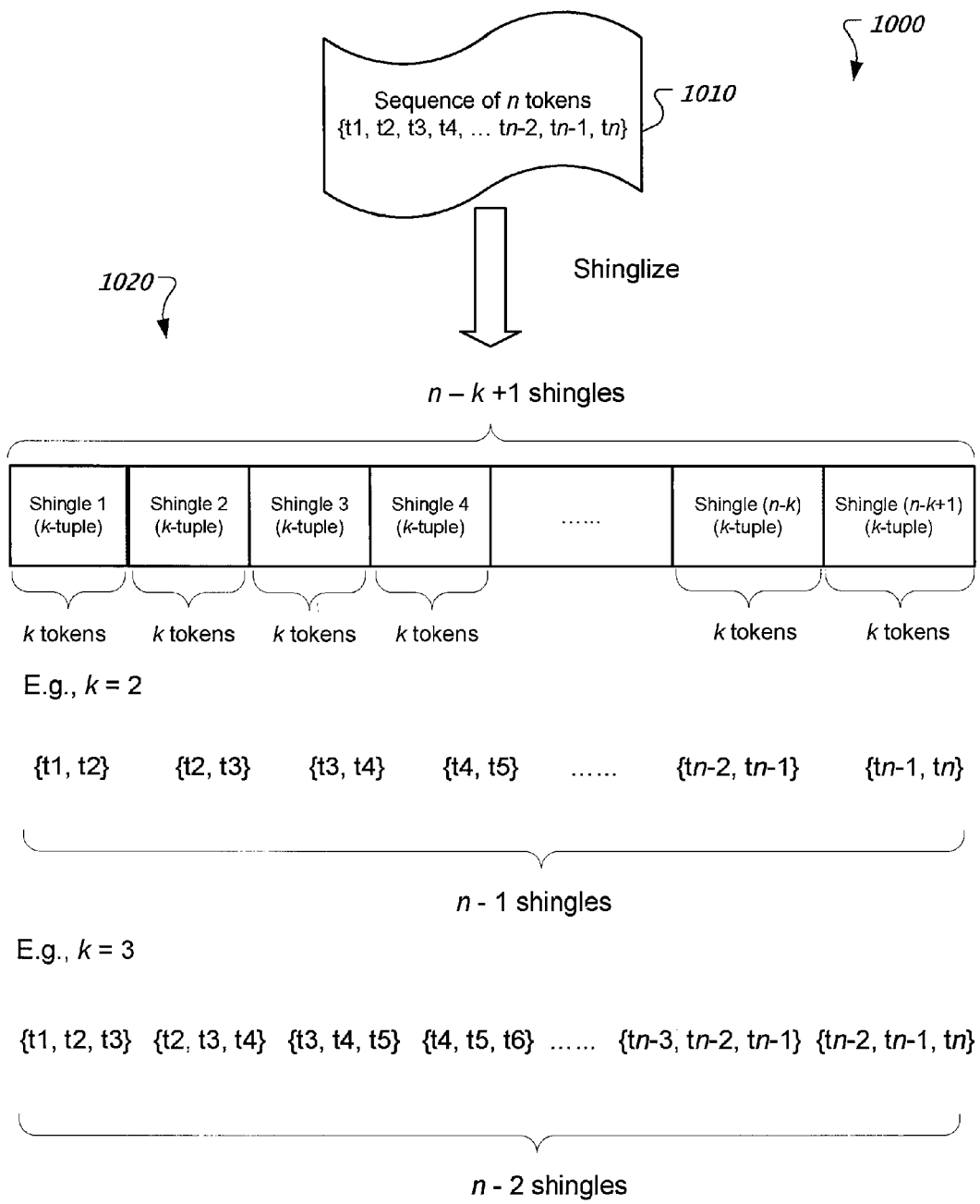
FIG. 1 illustrates an example process for parsing a sequence of n tokens into a set of shingles of k tokens.

FIG. 1 illustrates an example process 1000 for parsing a sequence 1010 of n tokens into a set of shingles of k tokens 1020, where n and k can be any number while k is <=n. A sequence of tokens can exist in any document, word or symbol strings, DNA series, for example.

A token can be a letter or a character. Alternatively, a token can be a word or a string of letters, characters, symbols, or words. Each token can have a numerical value associated with it. For a token such as a word or string, a numerical value can be generated by a hash function. A hash function can convert a word or string into a number that serves as a "fingerprint" of the word or string. The generated fingerprint can be used as indices in a hash table, an intermediate hash file, or any like data structure. In various implementations, the range of fingerprint values is relatively small, which can be achieved by applying modulo computations on initial fingerprint values.

A shingle is a contiguous subsequence of tokens. A shingle or a subsequence of tokens can be of different sizes. In FIG. 1, a shingle consists of k adjoining tokens extracted from the sequence 1010 of n tokens {t1, t2, t3, t4, tn−2, tn−1, tn}. In some implementations, the shingle generating process used in FIG. 1 can be conceived as a shifting window. The window begins with framing the first token to the k-th token in the sequence 1010, and then shifts one position ahead each time to generate a new shingle. Applying this shingling pattern, the shingles 1020 of k tokens are generated, where the first shingle consists of tokens t1 to tk, the second shingle consists of tokens t2 to tk+1, the third shingle consists of tokens from t3 to tk+2, . . . and the last shingle consists of tokens from tn−k+1 to tn. In some implementations, the total number of the shingles of k tokens extracted from the sequence of n tokens is (n−k+1). In other implementations, the total number of the shingles of k tokens extracted from the sequence of n tokens is less than (n−k+1).

The shingle having k tokens is designated a "k-tuple." If k equals 2, 2-tuples generated from the sequence 1010 are {t1, t2}, {t2, t3}, {t3, t4}, . . . {tn−2, tn−1}, {tn−1, tn}. The total number of the 2-tuples is (n−2+1)=(n−1). If k equals 3, 3-tuples generated from the sequence 1010 are {t1, t2, t3}, {t2, t3, t4}, {t3, t4, t5}, . . . {tn−3, tn−2, tn−1}, {tn−2, tn−1, tn}. The total number of the 3-tuples is (n−3+1)=(n−2).

The order of the k tokens in each of the shingles parsed from the sequence of n tokens can be the order of the sequence of n tokens itself. In various implementations, the order of the k tokens in each shingle parsed from the sequence of n tokens can be reverse to the order of the sequence of n tokens. Orders of tokens in shingles parsed from different sequences for comparing can be the same with each other.

In some implementations, shingles are used to evaluate similarity of two or more sequences of tokens. By way of illustration, an extent to which two sequences A and B resemble each other can be represented by the match rate of the two documents' shingles:

$$\text{Match Rate }(A, B) = \frac{\text{Shingles }(A) \text{ cup Shingles }(B)}{\text{Shingles }(A) \text{ cap Shingles }(B)}$$

In this exemplary formula, "Shingles (A) cap Shingles (B)" is the number of common shingles that sequence A and sequence B share. "Shingles (A) cup Shingles (B)" is the larger number of sequence A's shingles and sequence B's shingles. The match rate ranges from 0 to 1, where 1 indicates that the two sequences A and B are identical, and 0 indicates that they are dissimilar. Typically, the closer the match rate approaches 1, the more similar the sequences A and B are.

Figure 2:
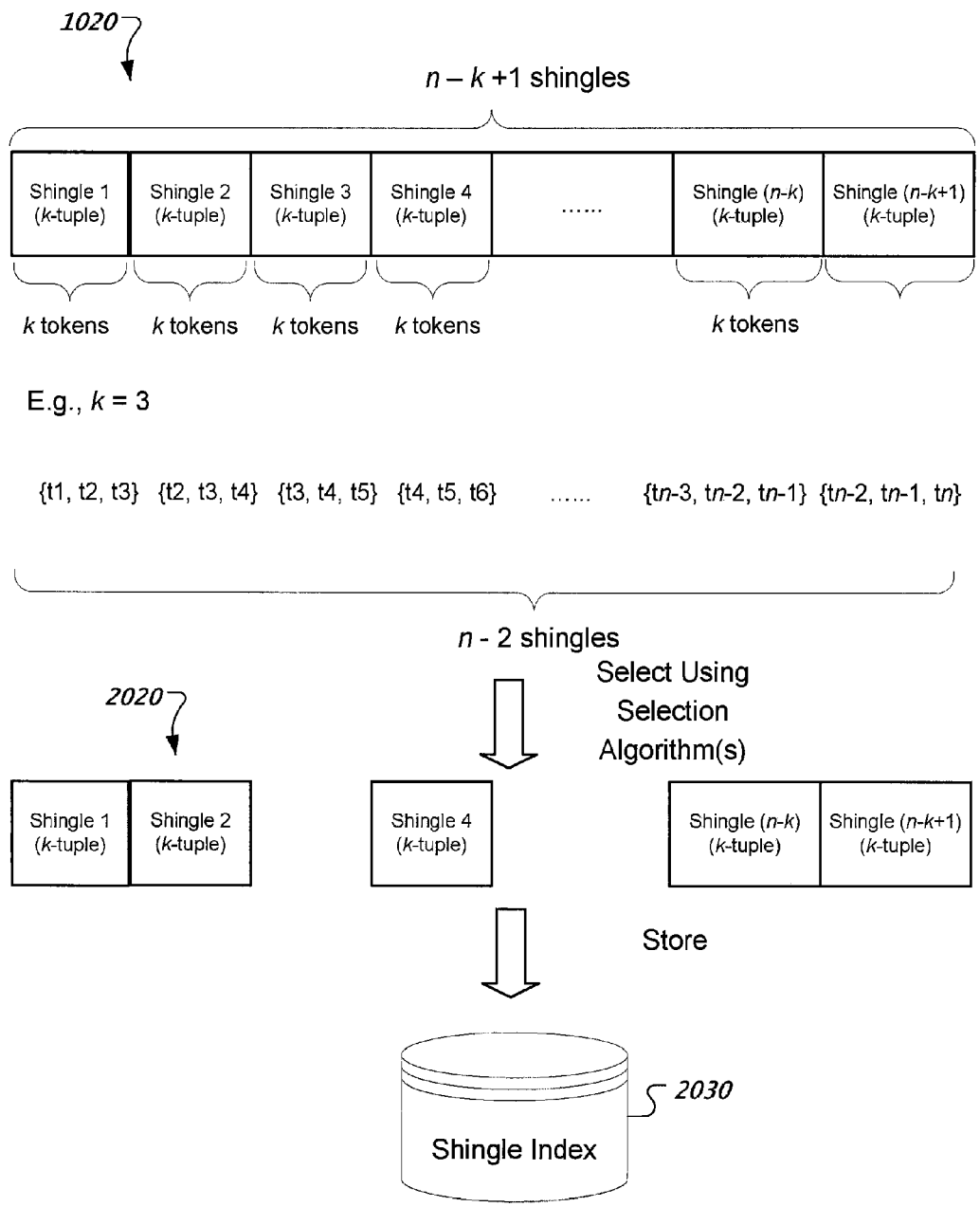
FIG. 2 illustrates an example process for selecting a subset from a whole set of shingles parsed from a sequence of n tokens.

FIG. 2 illustrates an example process 2000 for selecting a subset 2020 from a whole set 1020 of shingles parsed from a sequence of n tokens. Each shingle in the set 1020 consists of k contiguous tokens extracted from the sequence 1010 of n tokens, as already explained in FIG. 1, where n and k can be any number, while k is <=n. In some implementations, the subset 2020 of shingles is sufficient to represent the whole set of shingles for the purpose of evaluating resemblance of the sequence 1010 and another sequence. In various implementations, the shingles in the subset 2020 are used to be compared against each other.

In FIG. 2, the whole set 1020 of shingles has been generated from the sequence 1010 of n tokens following the shingling pattern described above. The subset 2020 of shingles can be selected by applying a selection algorithm, which will be described below. The selection algorithm can test the whole set 2010 of shingles and determine if each shingle being tested should be accepted into the subset 2020. For example, in FIG. 2, only Shingle 1, Shingle 2, Shingle 4, Shingle (n−k), and Shingle (n−k+1) have passed the testing of selection algorithm, and therefore they are the only shingles selected into the subset 2020.

The shingles in the subset 2020 can be stored and indexed in a data store 2030. The data store can be a table, database, or a similar data structure. In various implementations, the indices of the shingles stored in the data store 2030 can be used for comparison against each other, or against another group of indices. In some implementations, even a subset of the shingles selected by the selection algorithm can be used for sequence comparing, or other applications.

In some implementations, the selected subset of shingles 2020 are used to find exact matches for two or more sequences of tokens. In this context, two features are desirable for a qualified selection algorithm, "consistency" and "coverage." The way shingles are generated and selected should be consistent over all sequences of tokens that are to be compared. A consistent selection pattern can guarantee that for any sequence each token can be included in at least one selected shingle.

In other implementations, the selected subset of shingles 2020 are used to find approximate matches for Hamming or other edit distance applications, for example. Approximate matching schemes can be initially used to screen sequences for reducing the number of sequences to be compared under exact matching schemes. In other words, approximate matching schemes can be adopted to compare a large number of sequences to select a set of relatively similar sequences, which in various implementations, is sufficient for comparison purposes. However, if exact matches are desired, further comparing by using relatively extensive sets of shingles parsed from sequences to be compared can be used, for example. Optionally, complete sequences of tokens can be stored and processed for comparing purposes, in a database, date files, or a similar data structure.

The selected subset of shingles 2020 can be used in different applications for sequence matching, such as document similarity determination or detection, biological databases, and text compression. In a scenario of document similarity determination or detection, sequences of tokens can be sequences of words or characters which constitute documents. Both approximate and exact matching can apply in this scenario.

In some implementations, there is a large number of text documents D which are used to be compared against a smaller amount of query documents Q. In various implementations, indices of all shingles of documents D are stored in a database to be processed. Each time a new set of query documents Q is received, a subset of shingles is selected and generated from the whole set of shingles for documents D using the selection algorithm. In other implementations, the subset of shingles is selected in advance and only the selected shingles are indexed and stored in the database to be processed. The size of the index or the value of k can be adjusted in correspondence to the selection rate of shingles.

In a scenario of biological databases, sequences of tokens can be protein or nucleic acid sequences collected in large databases. Both approximate and exact matching can apply in this scenario. As with the document similarity determination scenario, there can be a smaller number of query sequences Q of protein or nucleic acid to be compared with a large amount of such sequences D in a database. In various implementations, indices of all shingles of sequences D are stored in a database to be processed. Each time a new set of query sequences Q is received, a subset of shingles will be selected and generated from the whole set of shingles for sequences D using the selection algorithm. In other implementations, the subset of shingles is selected in advance and only the selected shingles are indexed and stored in the database to be processed. The size of the index or the value of k can be adjusted in correspondence to the selection rate of shingles.

In a scenario of compression algorithms, sequences of tokens can be sequences of characters, letters, or symbols. Both approximate and exact matching can apply in this scenario. In some implementations, a compression application is used to identify repeated subsequences in a sequence of tokens and subsequently reduce redundancy caused by the repetitions. In some implementations, a sequence of tokens can be processed and the complete set of the generated shingles are stored in a hash table. In other implementations, the subset of shingles is selected in advance and only the selected shingles are indexed and stored in the database to be processed. The size of the index or the value of k can be adjusted in correspondence to the selection rate of shingles.

Figure 3:
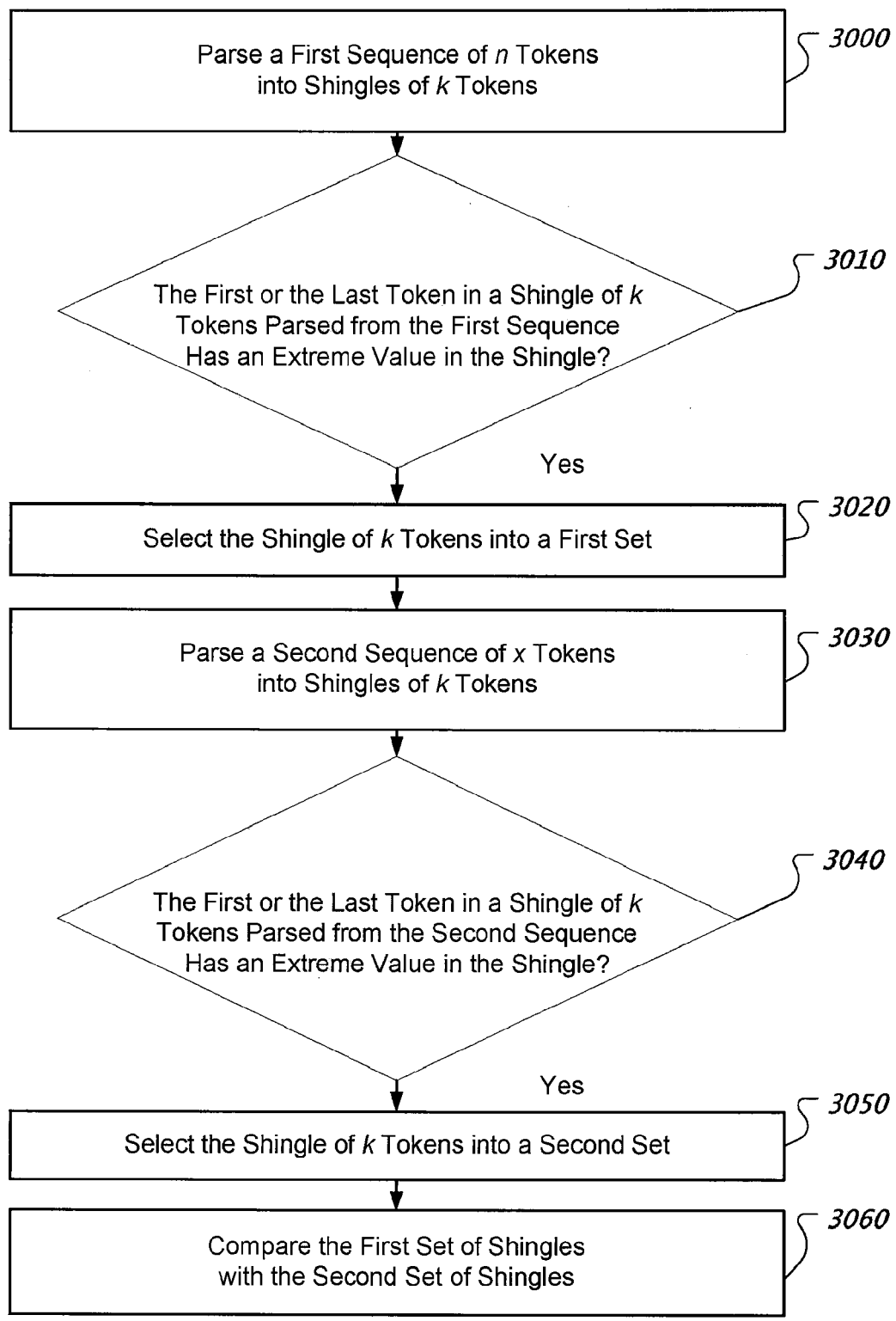
FIG. 3 illustrates an example process for using extreme token values to select subsets from shingles of k tokens generated from sequences of tokens for sequence or subsequence comparison.

FIG. 3 illustrates an example process for using extreme token values to select subsets from shingles of k tokens generated from sequences of tokens for sequence or subsequence comparison. In this example process, a first sequence of n tokens is parsed into shingles of k tokens (step 3000). Each of the tokens has a numerical value, where n and k can be any number while k is <=n. By way of illustration, the first sequence of n tokens can be parsed into (n−k+1) shingles of k tokens, whose respective k tokens follow the same order in the first sequence of n tokens. Optionally, shingles can be parsed from a partial first sequence, and the shingles parsed from the partial first sequence can be selected and used for subsequence comparison. In various implementations, the numerical values of the tokens can be initial values modulo k.

Subsequent to parsing the first sequence of n tokens into the shingles of k tokens, whether the first or the last token in a shingle of k tokens parsed from the first sequence of n tokens has the shingle's extreme value can be determined, e.g., for each shingle of k tokens parsed from the first sequence of n tokens (step 3010). The extreme value can be either the largest or smallest value in a shingle of k tokens, provided only one of the largest and smallest value applies for all shingles of k tokens to be checked. For example, if the extreme value is chosen to be the largest value, for each shingle of k tokens to be checked, only whether the largest value of the shingle exists in the first or the last token of a shingle is determined. In other words, whether the smallest value of the shingle exists in the first or the last token of a shingle is not determined in this example.

For each shingle of k tokens parsed form the first sequence of n tokens, if the first or the last token in the shingle is determined to have the shingle's extreme value (e.g., the largest value), the shingle is selected to a first set of shingles (step 3020). For example, given a shingle {t1, t2, t3, t4, t5} whose value is {38, 49, 66, 01, 99}, the last token t5 has the largest value 99 among all values of the shingle. This shingle can be selected into the first set. For another example, given a shingle {t6, t7, t8, t9, t10} whose value is {27, 89, 13, 25, 40}, neither the first token t6 nor the last token t10 has the largest value among all values of the shingle. This shingle will not be selected into the first set.

The correctness of the selection algorithm using extreme token values, as illustrated above, can be proved. Given a position u in a sequence with a value j, j is an extreme value for either a shingle of k tokens starting at u or a shingle of k tokens ending at u in which case the shingle of k tokens starting or ending at position u is accepted into the first set. Alternatively, assume an extreme value of a length ($2k$-$1$) sequence centered around u to be at an arbitrary position u+s, where the shift s can be from −(k−1) to +(k−1). If s is <0, then a shingle of k tokens starting at u+s begins with an extreme value and is accepted into the first set, covering u. If s is >0, a shingle of k tokens ending at u+s ends in an extreme value and is selected into the first set, covering u.

The acceptance rate for the selection algorithm using extreme token values is described below: the lower bound is 2/k and is dependent on the value range of the numerical values of the tokens in sequences; the larger the value range is, the lower the acceptance rate is.

Steps 3000-3020 can be repeated over different sequences of tokens to be compared. By way of illustration, a second sequence of x tokens can be parsed into shingles of k tokens (step 3030), in the same manner as described in step 3000. Subsequent to parsing the second sequence of x tokens into the shingles of k tokens, whether the first or the last token in a shingle of k tokens parsed from the second sequence of x tokens has the shingle's largest or smallest value can be determined, for each shingle parsed from the second sequence of x tokens (step 3040), for example. If the first or the last token in a shingle of k tokens parsed from the second sequence of x tokens is determined to have the shingle's largest or smallest value, the shingle is selected into a second set of shingles (step 3050).

The first set of shingles and the second set of shingles selected by the selection algorithm can be compared against each other (3060). In various implementations, a portion of the first set of shingles and a portion of the second set of shingles can be compared against each other. As described above, comparison of the two sets of shingles can be used in both approximate matching and exact matching schemes, which include various applications such as document similarity determination, biological database comparisons, or compression algorithms. In various implementations, even further subsets of the selected shingles can be used for comparison.

Figure 4:
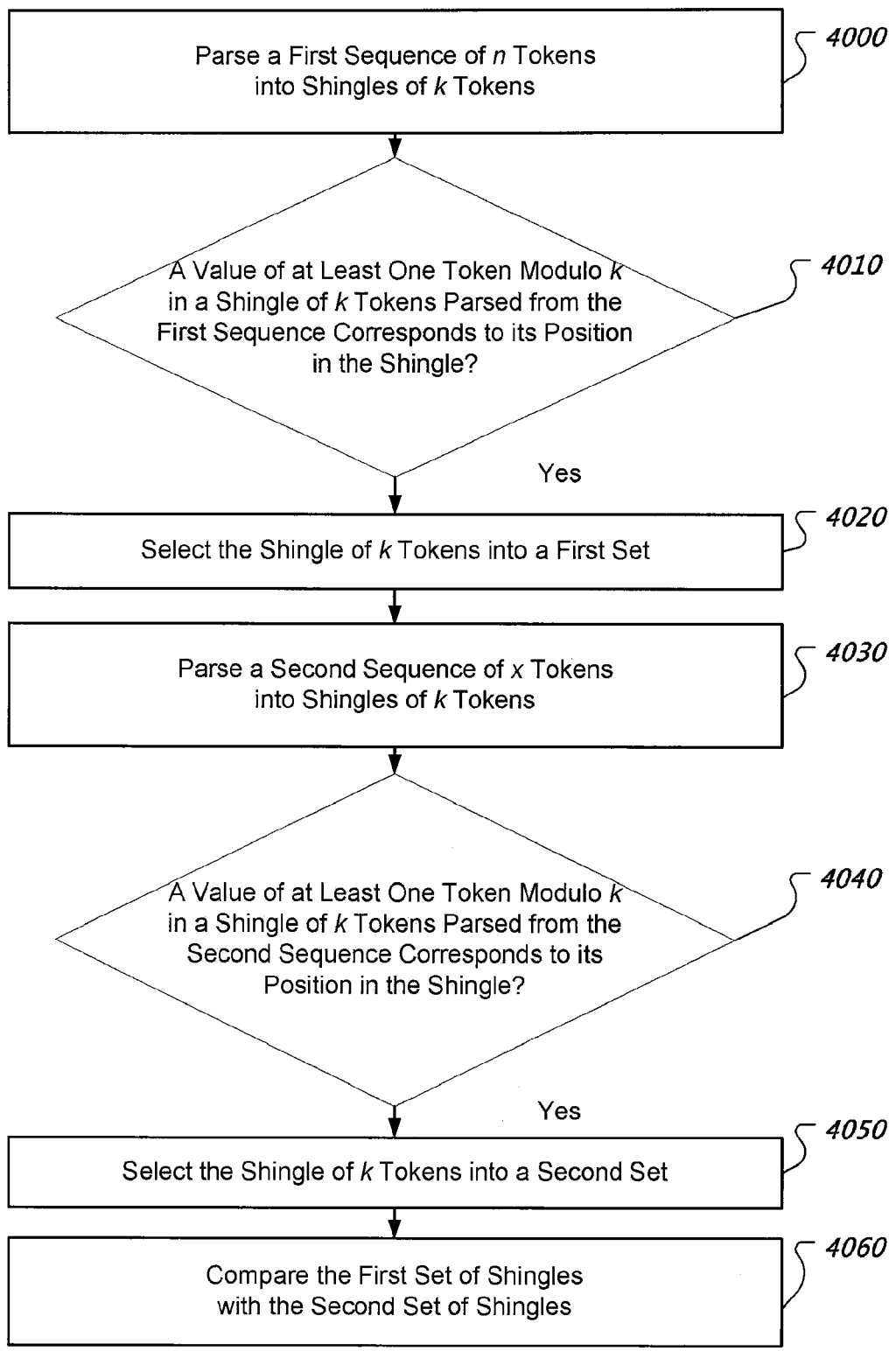
FIG. 4 illustrates an example process for using token values modulo k to select subsets from shingles of k tokens generated from sequences of tokens for sequence or subsequence comparison.

FIG. 4 illustrates an example process for using token values modulo k to select subsets from shingles of k tokens generated from sequences of tokens for sequence comparison. As with FIG. 3, a first sequence of n tokens can be parsed into shingles of tokens (step 4000). Each of the shingles has k tokens. By way of illustration, the first sequence of n tokens can be parsed into (n−k+1) shingles of k tokens, whose respective k tokens follow the same order in the first sequence of n tokens. Optionally, shingles can be parsed from a partial first sequence, and the shingles parsed from the partial first sequence can be selected and used for subsequence comparison.

Subsequent to parsing the first sequence of n tokens into the shingles of k tokens, whether a numerical value of at least one token in a shingle of k tokens parsed from the first sequence of n tokens corresponds to its position in the shingle can be determined, for each shingle parsed from the first sequence of n tokens (step 4010), for example. If a numerical value of at least one token in a given shingle parsed from the first sequence of n tokens corresponds to a position of the at least one token in the shingle, the shingle is selected to a first set of shingles (step 4020).

For instance, as illustrated below, a shingle {t1, t2, t3, t4, t5} has value of {25, 32, 41, 54, 96}. The value of the first token modulo k (=5) is 00, which corresponds to the first position designated 00. Therefore, this shingle can be selected into the first set.

| FINGERPRINTS: | {25, 32, 41, 54, 96} |
|---|---|
| FINGERPRINTS mod k: | {00, 02, 01, 04, 01} |
| POSITIONS: | {00, 01, 02, 03, 04} |

For another instance, as illustrated below, given a shingle {t6, t7, t8, t9, t10} whose value is {43, 49, 90, 61, 27}, no value of any token modulo k (=5) corresponds to the position of the token in the shingle, as can be seen below. Therefore, this shingle will not be selected into the first set.

| FINGERPRINTS: | {43, 49, 90, 61, 27} |
|---|---|
| FINGERPRINTS mod k: | {03, 04, 00, 01, 02} |
| POSITIONS: | {00, 01, 02, 03, 04} |

The correctness of the selection algorithm using token values modulo k as illustrated above can be proved. For a given sequence of 2k−1 tokens, each token has a numerical value modulo k between 0 to k−1. Therefore, a given token will lead to acceptance in one of the k−1 shingles of k tokens covering the given token.

The acceptance rate for the selection algorithm using token values modulo k is described below: the acceptance rate of $1-((k-1)^k/k^k)$, where k=2, is about 0.7 and quickly converges to about 0.63.

Steps 4000-4020 can be repeated over different sequences of tokens to be compared. By way of illustration, a second sequence of x tokens can be parsed into shingles of k tokens (step 4030), in the same manner as described in step 4000. Subsequent to parsing the second sequence of x tokens into the shingles of k tokens, whether a numerical value of at least one token in a shingle of k tokens parsed from the second sequence of x tokens corresponds to a position of the at least one token in the shingle can be determined, for each shingle parsed from the second sequence of x tokens (step 4040), for example. If a numerical value of at least one token in a given shingle parsed from the second sequence of x tokens corresponds to a position of the at least one token in the shingle, the shingle is selected into a second set of shingles (step 4050).

The first set of shingles and the second set of shingles selected by the selection algorithm can be compared against each other (4060). In various implementations, a portion of the first set of shingles and a portion of the second set of shingles can be compared against each other. As with FIG. 3, comparison of the two sets of shingles can be used in both approximate matching and exact matching schemes, which include various applications such as document similarity determination, biological database comparisons, or compression algorithms. In various implementations, even further subsets of the selected shingles can be used for comparison.

Figure 5:
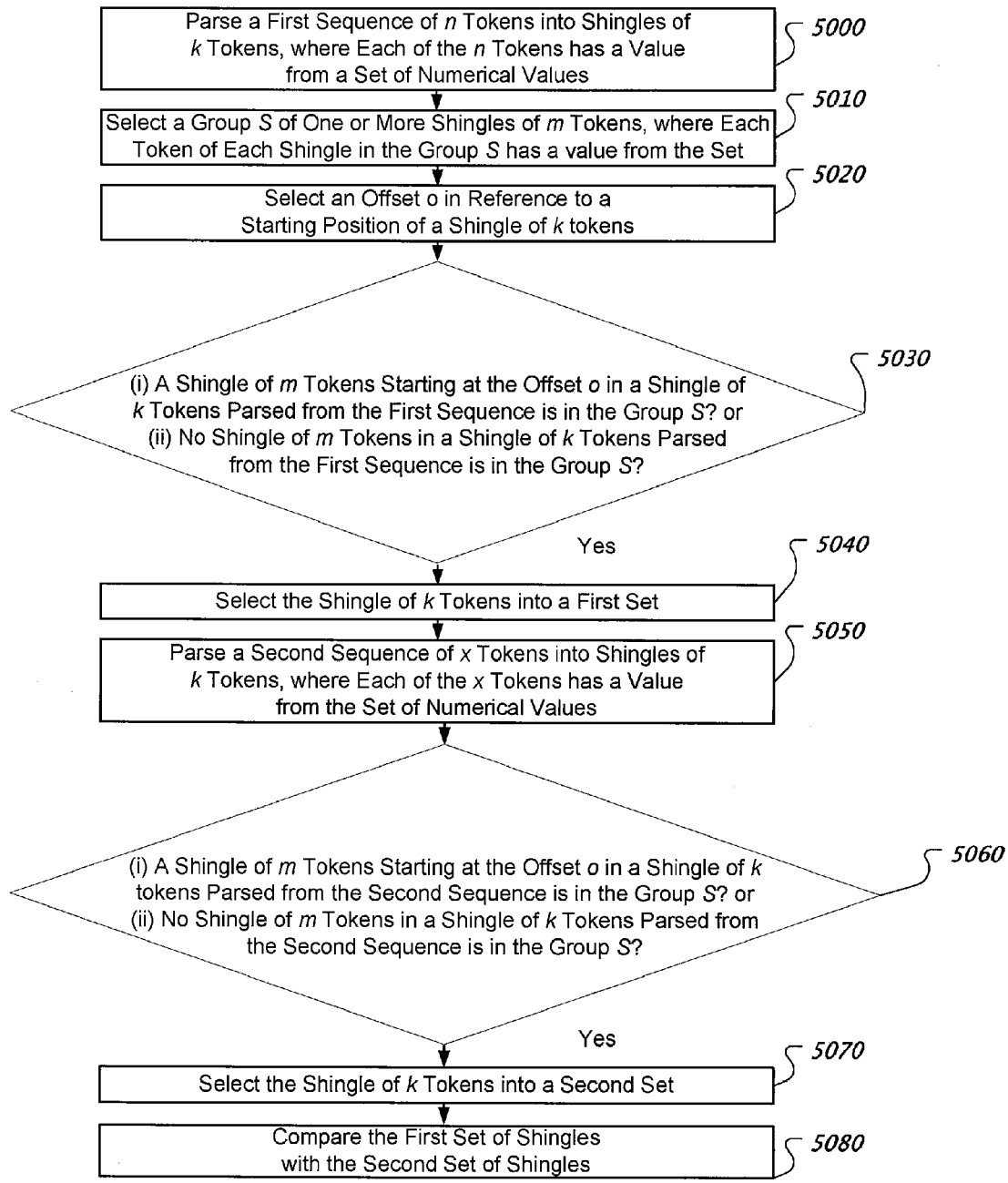
FIG. 5 illustrates an example process for using shingles of m tokens to select subsets from shingles of k tokens generated from sequence of tokens for sequence or subsequence comparison.

FIG. 5 illustrates an example process for using shingles of m tokens to select subsets from shingles of k tokens generated from sequences of tokens for sequence or subsequence comparison. As with FIG. 3 and FIG. 4, a first sequence of n tokens can be parsed into shingles of k tokens (step 5000). Each of the n tokens has a value from a set of numerical values. The set of numerical values can be designated "Sigma." In various implementations, the numerical values in a Sigma can be initial values modulo k, so that the numerical values in the Sigma ranges only from 0 to k−1.

In some implementations, n and k can be any number while k<=n. By way of illustration, the first sequence of n tokens can be parsed into (n−k+1) shingles of k tokens, whose respective k tokens follow the same order in the first sequence of n tokens.

A group S of one or more shingles of m tokens can be selected from shingles of m tokens where each token of each shingle in the group S has a value from the set of numerical values (step 5010), where m<=k. For example, if the set of numerical values, i.e., Sigma, equals {00, 01, 02}, and m=1, the group S can be selected from the shingles of m tokens generated from the Sigma, i.e., shingles of 1 token (00), (01), and (02). Consequently, the group S can be {(00), (01)}, for example. In other words, a group S can be a subset of shingles of m tokens that are any combinations of m numerical values from Sigma.

An offset o in reference to a starting position of a shingle of k tokens can be selected (step 5020), while o<=(k−m+1). The offset o can be used in reference to a starting position of any shingles of k tokens. For example, given a scenario where k=5 and m=3, o can be 0, 1, 2, or 3. In a shingle of 5 tokens {t1, t2, t3, t4, t5} as illustrated below, the offset o can refer to t1 if o=00, t2 if o=01, t3 if o=02, t4 if o=03, and t5 if o=04.

| SHINGLE OF m TOKENS: | {t1, t2, t3, t4, t5} |
|---|---|
| OFFSET o: | {00, 01, 02, 03, 04} |

Subsequent to parsing the first sequence of n tokens into the shingles of k tokens and selecting the offset o as well as the group S, whether one of the two following scenarios exists can be determined: (i) a shingle of m tokens starting at the offset o in a shingle of k tokens parsed from the first sequence of n tokens is in the group 5; and (ii) no shingle of m tokens in a shingle of k tokens parsed from the first sequence of n tokens is in the group S (step 5030). The determination described in step 5030 can be made for each of the shingles of k tokens that are parsed from the first sequence of n tokens, for example.

If one of the scenarios exists, the shingle of k tokens parsed from the first sequence of n tokens can be selected into the first set of shingles of k tokens (step 5040). For instance, a shingle of k (=5) tokens {t1, t2, t3, t4, t5} has value of {00, 01, 02, 01, 00}. Suppose m=1, the group S of shingles of m tokens is (00), and the offset o is 0. In this shingle of k tokens, the shingle of m token(s) starting at the offset o is (00), which is in the group S {(00)}. Thus this shingle of k tokens can be selected into the first set.

For another instance, given the same parameters in the previous instance, a shingle of k tokens {t6, t7, t8, t9, t10} has value {01, 00, 02, 00, 01}. The shingle of m token(s) starting at the offset o in the shingle of k tokens is 1011, which is not in the group S {00}. Two other shingles of m tokens, however, are in the group S {(00)}. This shingle of k tokens meets neither the first nor the second scenario and thus cannot be selected into the first set.

For yet another instance, given the same parameters in the previous instance, a shingle of k tokens {t11, t12, t13, t14, t15} has value {01, 02, 01, 02, 01}. The shingle of m token(s) starting at the offset o in the shingle of k tokens is (01), which is not in the group S {(00)}. Additionally, none of the other shingles of m tokens in the shingle of k tokens is in the group S {(00)}. Therefore, this shingle can be selected into the first set.

More examples may be helpful for understanding the algorithm described in FIG. 5. In these examples where k=5, m=2, the offset o is 0, and the Sigma is {00, 01, 02}, the group S can be a subset of any combinations of in numerical values from the Sigma, e.g., {(00, 00), (00, 01)}.

| GROUP S OF SHINGLES OF m TOKENS: | {(00, 00), (00, 01)} |
|---|---|
| SHINGLE OF k TOKENS: | {00, 00, 02, 01, 00} |

The shingle of m tokens starting at the offset o in the shingle of k tokens is (00, 00), which is in the group S. Thus this shingle of k tokens can be selected into the first set.

| GROUP S OF SHINGLES OF m TOKENS: | {(00, 00), (00, 01)} |
|---|---|
| SHINGLE OF k TOKENS: | {00, 01, 02, 01, 00} |

The shingle of m tokens starting at the offset o in the shingle of k tokens is (00, 01), which is in the group S. Thus this shingle of k tokens can be selected into the first set.

| GROUP S OF SHINGLES OF m TOKENS: | {(00, 00), (00, 01)} |
|---|---|
| SHINGLE OF k TOKENS: | {01, 01, 00, 01, 00} |

The shingle of m tokens starting at the offset o in the shingle of k tokens is (01, 01), which is not in the group S. However, a shingle of m tokens other than the shingle starting at the offset o (00, 01) is in the first group S of shingles of m tokens. Thus this shingle of k tokens can not be selected into the first set.

| GROUP S OF SHINGLES OF m TOKENS: | {(00, 00), (00, 01)} |
|---|---|
| SHINGLE OF k TOKENS: | {01, 01, 02, 01, 00} |

The shingle of m tokens starting at the offset o in the shingle of k tokens is (01, 01), which is not in the group S. In addition, no shingle of m tokens in the shingle of k tokens is in the group S. Thus this shingle of k tokens can also be selected into the first set.

The correctness of the selection algorithm using shingles of m tokens as illustrated above can be proved. For a given shingle of k tokens starting at position u, there are only three possibilities: (i) the shingle of k tokens contains a shingle of m tokens from the first group S of m tokens at the offset o, and thus the shingle of k tokens is accepted into the first set; (ii) the shingle of k tokens contains no shingle of m tokens from the first group S of m tokens at all, and thus the shingle of k tokens is accepted into the first set; and (iii) the shingle of k tokens contains at least one shingle of m tokens from the first group S of m tokens but not at the offset o, and thus the shingle of k tokens shifted by an appropriate amount is selected into the first set, and the shingle of k tokens covers u.

The acceptance rate for the selection algorithm using shingle of m tokens is described below. For an example where m=1, the size of a first group S of m tuples =1, and k=10, the acceptance rate is 0.50, 0.35, 0.31, 0.31, respectively corresponding to numerical values of tokens which range from 0 to 1, 0 to 2, 0 to 3, and 0 to 4.

Steps 5000-5040 can be repeated over different sequences of tokens to be compared. By way of illustration, a second sequence of x tokens can be parsed into shingles of k tokens (step 5050), in the same manner as described in step 5000. Subsequent to parsing the second sequence of x tokens into the shingles of k tokens, whether one of the two following scenarios exists can be determined: (i) a shingle of m tokens starting at the offset o in a shingle of k tokens parsed from the second sequence of x tokens is in the second group of shingles of m tokens; and (ii) no shingle of m tokens in a shingle of k tokens parsed from the second sequence of x tokens is in the second group of shingles of m tokens (step 5060). The determination described in step 5060 can be made for each of the shingles of k tokens that are parsed from the second sequence of x tokens, for example. If one of the scenarios exists, the shingle of k tokens parsed from the second sequence of x tokens can be selected into the second set of shingles of k tokens (step 5070).

The first set of shingles and the second set of shingles selected by the selection algorithm can be compared against each other (5080). In various implementations, a portion of the first set of shingles and the second set of shingles can be compared against each other. As with FIG. 3 and FIG. 4, comparison of the two sets of shingles can be used in both approximate matching and exact matching schemes, which include various applications such as document similarity determination, biological database comparisons, or compression algorithms. In various implementations, even further subsets of the selected shingles can be used for comparison.

Figure 6:
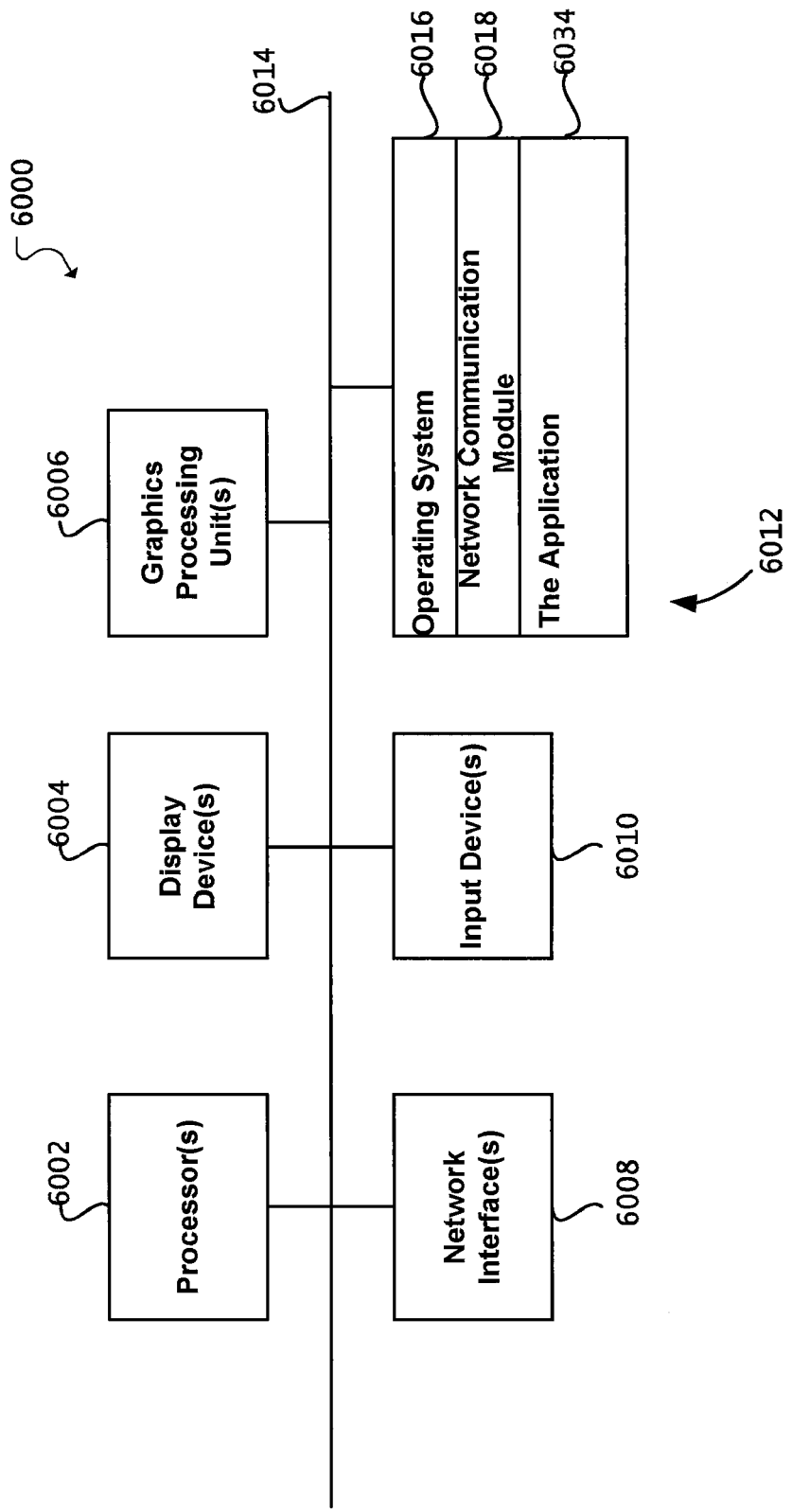
FIG. 6 is a block diagram of exemplary system architecture for selecting shingles from sequences of tokens for sequence or subsequence comparison.

FIG. 6 is a block diagram of exemplary system architecture 6000 for selecting shingles from sequences of tokens for sequence or subsequence comparison. The architecture 6000 includes one or more processors 6002 (e.g., IBM PowerPC®, Intel Pentium® 4, etc.), one or more display devices 6004 (e.g., CRT, LCD), one or more graphics processing units 6006 (e.g., NVIDIA® Quadro FX 4500, GeForce® 7800 GT, etc.), one or more network interfaces 6008 (e.g., Ethernet, FireWire, USB, etc.), one or more input devices 6010 (e.g., keyboard, mouse, game controller, camera, microphone, etc.), and one or more computer-readable mediums 6012 (e.g. SDRAM, optical disks, hard disks, flash memory, L1 or L2 cache, etc.). These components can exchange communications and data via one or more buses 6014 (e.g., EISA, PCI, PCI Express, etc.).

The term "computer-readable medium" refers to any medium that participates in providing instructions to a processor 6002 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 6012 further includes an operating system 6016 (e.g., Mac OS®, Windows®, Linux, etc.), a network communication module 6018, and an application of selecting shingles from sequences of tokens and comparing sequences or subsequences 6034.

The operating system 6016 can be multi-user, multiprocessing, multitasking, multithreading, real-time and the like. The operating system 6016 performs basic tasks, including but not limited to: recognizing input from input devices 6010; sending output to display devices 6004; keeping track of files and directories on computer-readable mediums 6012 (e.g., memory or a storage device); controlling peripheral devices (e.g., disk drives, printers, GPUs 6006, etc.); and managing traffic on the one or more buses 6014. The network communications module 6018 includes various components for establishing and maintaining network connections (e.g., software for implementing communication protocols, such as TCP/IP, HTTP, Ethernet, etc.). The application 6034, together with its components, implements various tasks and functions, as described with respect to FIG. 1-FIG. 5.

The user system architecture 6000 can be implemented in any electronic or computing device capable of hosting the application 6034, or part of the application 6034, including but not limited to: portable or desktop computers, workstations, main frame computers, personal digital assistants, portable game devices, mobile telephones, network servers, etc. All of these component may by physically remote to each other.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, brain waves, other physiological input, eye movements, gestures, body movements, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method for selecting shingles, the method comprising:
    parsing, by one or more processors, a first sequence of n tokens into shingles of k tokens, where k and n are numerical values and k<=n, and where each of the n tokens has a numerical value;
    selecting a first set of shingles of k tokens from the shingles of k tokens parsed from the first sequence of n tokens, where each shingle in the first set includes one of (i) a token in a first position in the shingle having a largest numerical value of all tokens in the shingle or (ii) a token in a last position in the shingle having the largest numerical value of all tokens in the shingle;
    parsing a second sequence of x tokens into shingles of k tokens, where x is a numerical value and k<=x, and where each of the x tokens has a numerical value;
    selecting a second set of shingles of k tokens from the shingles of k tokens parsed from the second sequence of x tokens, where each shingle in the second set includes one of (i) a token in a first position in the shingle having a largest numerical value of all tokens in the shingle or (ii) a token in a last position in the shingle having the largest numerical value of all tokens in the shingle; and
    comparing at least a portion of the first set of shingles of k tokens with at least a portion of the second set of shingles of k tokens.

2. The method of claim 1, where each token in the first sequence is one of a letter, a character, a word, and a string.

3. The method of claim 1, where the numerical value of each token in the first sequence is a number modulo k.

4. The method of claim 1, further comprising:
    receiving the first sequence of n tokens; and
    selecting the second sequence of x tokens from a data store.

5. The method of claim 1, where the first sequence and the second sequence are respective portions of one sequence.

6. The method of claim 1, further comprising:
    evaluating similarity by using the value of k and a number of one or more shingles in the first set that match one or more shingles in the second set.

7. The method of claim 1, wherein for each shingle of k tokens in the first set an order of the tokens in the shingle is the same as an order of those tokens in the first sequence of n tokens or for each shingle of k tokens in the first set the order of the tokens in the shingle is the reverse order of the order of those tokens in the first sequence of n tokens.

8. The method of claim 1, wherein k is greater than 2.

9. A computer-implemented method for selecting shingles, the method comprising:
    parsing, by one or more processors, a first sequence of n tokens into shingles of k tokens, where k and n are numerical values and k<=n, and where each of the n tokens has a numerical value;
    for each shingle of k tokens from the first sequence:
        determining modulo values of the tokens in the shingle based on the numerical values of the tokens in the shingle modulo k;
        determining positions of the tokens in the shingle, wherein the position of a token in the shingle specifies an order of the token in the shingle with respect to other tokens in the shingle;
        comparing the modulo values of the tokens in the shingle with the respective positions of the tokens in the shingle;
    selecting a first set of the shingles of k tokens from the shingles of k tokens from the first sequence based on the comparison, where for each shingle of k tokens in the first set the modulo value of at least one token in the shingle of the first set matches the respective position of the at least one token in the shingle of the first set;
    parsing a second sequence of x tokens into shingles of k tokens, where x is a numerical value and k<=x, and where each of the x tokens has a numerical value;
    for each shingle of k tokens from the second sequence:
        determining modulo values of the tokens in the shingle based on the numerical values of the tokens in the shingle modulo k;
        determining positions of the tokens in the shingle, wherein the position of a token in the shingle specifies an order of the token in the shingle with respect to other tokens in the shingle;
        comparing the modulo values of the tokens in the shingle with the respective positions of the tokens in the shingle;
    selecting a second set of shingles of k tokens from the shingles of k tokens from the second sequence based on the comparison, where for each shingle of k tokens in the second set the modulo value of at least one token in the shingle of the second set matches the respective position of the at least one token in the shingle of the second set; and
    comparing at least a portion of the first set of shingles of k tokens with at least a portion of the second set of shingles of k tokens.

10. The method of claim 9, where each token in the first sequence is one of a letter, a character, a word, and a string.

11. The method of claim 9, where the position of each token in a shingle is represented by one of 0 to (k−1), incremented by 1.

12. The method of claim 9, further comprising:
    receiving the first sequence of n tokens; and
    selecting the second sequence of x tokens from a data store.

13. The method of claim 9, where the first sequence and the second sequence are respective portions of one sequence.

14. The method of claim 9, further comprising:
    evaluating similarity by using the value of k and a number of one or more shingles in the first set that match one or more shingles in the second set.

15. A computer-implemented method for selecting shingles, the method comprising:
    parsing, by one or more processors, a first sequence of n tokens into shingles of k tokens, where k and n are numerical values and k<=n, and where each of the n tokens has a value from a set of numerical values;

selecting a group S of one or more shingles of m tokens, where m is a numerical value and m<=k and where each token of each shingle in the group S has a value from the set of numerical values;

selecting an offset in reference to a starting position of a shingle of k tokens; and selecting a first set of the shingles of k tokens from the shingles of k tokens parsed from the first sequence of n tokens, where for each of the shingles in the first set:
   a shingle of m tokens starting at the offset in the shingle of k tokens in the first set is in the group S; or
   no shingle of m tokens in the shingle of k tokens in the first set is in the group S;

parsing a second sequence of x tokens into shingles of k tokens, where x is a numerical value and k<=x, and where each of the x tokens has a value from a set of numerical values;

selecting a second set of shingles of k tokens from the shingles of k tokens parsed from the second sequence of x tokens, where for each of the shingles in the second set:
   a shingle of m tokens starting at the offset in the shingle of k tokens in the second set is in the group S; or
   no shingle of m tokens in the shingle of k tokens in the second set is in the group S; and comparing at least a portion of the first set of shingles of k tokens with at least a portion of the second set of shingles of k tokens.

16. The method of claim 15, where each token in the first sequence is one of a letter, a character, a word, and a string.

17. The method of claim 15, where the offset is represented by one of 0 to (k−1), incremented by 1.

18. The method of claim 15, where the numerical value of each token in the first sequence is a number modulo k.

19. The method of claim 15, further comprising:
receiving the first sequence of n tokens; and
selecting the second sequence of x tokens from a data store.

20. The method of claim 15, where the first sequence and the second sequence are respective portions of one sequence.

21. The method of claim 15, further comprising:
evaluating similarity by using the value of k and a number of one or more shingles in the first set that match one or more shingles in the second set.

22. A computer program product, encoded on a computer-readable medium, operable to cause one or more processors to perform operations comprising:
   parsing, by one or more processors, a first sequence of n tokens into shingles of k tokens, where k and n are numerical values and k<=n, and where each of the n tokens has a numerical value; and
   selecting a first set of shingles of k tokens from the shingles of k tokens parsed from the first sequence of n tokens, where each shingle in the first set includes one of (i) a token in a first position in the shingle having a largest numerical value of all tokens in the shingle or (ii) a token in a last position in the shingle having the largest numerical value of all tokens in the shingle;
   parsing a second sequence of x tokens into shingles of k tokens, where x is a numerical value and k<=x, and where each of the x tokens has a numerical value;
   selecting a second set of shingles of k tokens from the shingles of k tokens parsed from the second sequence of x tokens, where each shingle in the second set includes one of (i) a token in a first position in the shingle having a largest numerical value of all tokens in the shingle or (ii) a token in a last position in the shingle having the largest numerical value of all tokens in the shingle; and
   comparing at least a portion of the first set of shingles of k tokens with at least a portion of the second set of shingles of k tokens.

23. A computer program product, encoded on a computer-readable medium, operable to cause one or more processors to perform operations comprising:
   parsing, by one or more processors, a first sequence of n tokens into shingles of k tokens, where k and n are numerical values and k<=n, and where each of the n tokens has a numerical value; and
   for each shingle of k tokens from the first sequence:
      determining modulo values of the tokens in the shingle based on the numerical values of the tokens in the shingle modulo k;
      determining positions of the tokens in the shingle, wherein the position of a token in the shingle specifies an order of the token in the shingle with respect to other tokens in the shingle;
      comparing the modulo values of the tokens in the shingle with the respective positions of the tokens in the shingle;
   selecting a first set of the shingles of k tokens from the shingles of k tokens from the first sequence based on the comparison, where for each shingle of k tokens in the first set the modulo value of at least one token in the shingle of the first set matches the respective position of the at least one token in the shingle of the first set;
   parsing a second sequence of x tokens into shingles of k tokens, where x is a numerical value and k<=x, and where each of the x tokens has a numerical value;
   for each shingle of k tokens from the second sequence:
      determining modulo values of the tokens in the shingle based on the numerical values of the tokens in the shingle modulo k;
      determining positions of the tokens in the shingle, wherein the position of a token in the shingle specifies an order of the token in the shingle with respect to other tokens in the shingle;
      comparing the modulo values of the tokens in the shingle with the respective positions of the tokens in the shingle;
   selecting a second set of shingles of k tokens from the shingles of k tokens from the second sequence based on the comparison, where for each shingle of k tokens in the second set the modulo value of at least one token in the shingle of the second set matches the respective position of the at least one token in the shingle of the second set; and
   comparing at least a portion of the first set of shingles of k tokens with at least a portion of the second set of shingles of k tokens.

24. A computer program product, encoded on a computer-readable medium, operable to cause one or more processors to perform operations comprising:
   parsing, by one or more processors, a first sequence of n tokens into shingles of k tokens, where k and n are numerical values and k<=n, and where each of the n tokens has a value from a set of numerical values;
   selecting a group S of one or more shingles of m tokens, where m is a numerical value and m<=k and where each token of each shingle in the group S has a value from the set of numerical values;
   selecting an offset in reference to a starting position of a shingle of k tokens; and selecting a first set of the shingles of k tokens from the shingles of k tokens parsed from the first sequence of n tokens, where for each of the shingles in the first set:
  a shingle of m tokens starting at the offset in the shingle of k tokens in the first set is in the group S; or
  no shingle of m tokens in the shingle of k tokens in the first set is in the group S;
parsing a second sequence of x tokens into shingles of k tokens, where x is a numerical value and k<=x, and where each of the x tokens has a value from a set of numerical values;
selecting a second set of shingles of k tokens from the shingles of k tokens parsed from the second sequence of x tokens, where for each of the shingles in the second set:
  a shingle of m tokens starting at the offset in the shingle of k tokens in the second set is in the group S; or
  no shingle of m tokens in the shingle of k tokens in the second set is in the group S; and
comparing at least a portion of the first set of shingles of k tokens with at least a portion of the second set of shingles of k tokens.

25. A server system comprising:
a computer readable medium comprising a computer program product; and
one or more processors operable to execute the computer program product to perform operations comprising:
  parsing a first sequence of n tokens into shingles of k tokens, where k and n are numerical values and k<=n, and where each of the n tokens has a numerical value;
  selecting a first set of shingles of k tokens from the shingles of k tokens parsed from the first sequence of n tokens, where each shingle in the first set includes one of (i) a token in a first position in the shingle having a largest numerical value of all tokens in the shingle or (ii) a token in a last position in the shingle having the largest numerical value of all tokens in the shingle;
  parsing a second sequence of x tokens into shingles of k tokens, where x is a numerical value and k<=x, and where each of the x tokens has a numerical value;
  selecting a second set of shingles of k tokens from the shingles of k tokens parsed from the second sequence of x tokens, where each shingle in the second set includes one of (i) a token in a first position in the shingle having a largest numerical value of all tokens in the shingle or (ii) a token in a last position in the shingle having the largest numerical value of all tokens in the shingle; and
  comparing at least a portion of the first set of shingles of k tokens with at least a portion of the second set of shingles of k tokens.

26. A server system comprising:
a computer readable medium comprising a computer program product; and
one or more processors operable to execute the computer program product to perform operations comprising:
parsing, by one or more processors, a first sequence of n tokens into shingles of k tokens, where k and n are numerical values and k<=n, and where each of the n tokens has a numerical value;
for each shingle of k tokens from the first sequence:
  determining modulo values of the tokens in the shingle based on the numerical values of the tokens in the shingle modulo k;
  determining positions of the tokens in the shingle, wherein the position of a token in the shingle specifies an order of the token in the shingle with respect to other tokens in the shingle;
  comparing the modulo values of the tokens in the shingle with the respective positions of the tokens in the shingle;
selecting a first set of the shingles of k tokens from the shingles of k tokens from the first sequence based on the comparison, where for each shingle of k tokens in the first set the modulo value of at least one token in the shingle of the first set matches the respective position of the at least one token in the shingle of the first set;
parsing a second sequence of x tokens into shingles of k tokens, where x is a numerical value and k<=x, and where each of the x tokens has a numerical value;
for each shingle of k tokens from the second sequence:
  determining modulo values of the tokens in the shingle based on the numerical values of the tokens in the shingle modulo k;
  determining positions of the tokens in the shingle, wherein the position of a token in the shingle specifies an order of the token in the shingle with respect to other tokens in the shingle;
  comparing the modulo values of the tokens in the shingle with the respective positions of the tokens in the shingle;
selecting a second set of shingles of k tokens from the shingles of k tokens from the second sequence based on the comparison, where for each shingle of k tokens in the second set the modulo value of at least one token in the shingle of the second set matches the respective position of the at least one token in the shingle of the second set; and
comparing at least a portion of the first set of shingles of k tokens with at least a portion of the second set of shingles of k tokens.

27. A server system comprising:
a computer readable medium comprising a computer program product; and
one or more processors operable to execute the computer program product to perform operations comprising:
  parsing a first sequence of n tokens into shingles of k tokens, where k and n are numerical values and k<=n, and where each of the n tokens has a value from a set of numerical values;
  selecting a group S of one or more shingles of m tokens, where m is a numerical value and m<=k and where each token of each shingle in the group S has a value from the set of numerical values;
  selecting an offset in reference to a starting position of a shingle of k tokens; and
  selecting a first set of the shingles of k tokens from the shingles of k tokens parsed from the first sequence of n tokens, where for each of the shingles in the first set:
    a shingle of m tokens starting at the offset in the shingle of k tokens in the first set is in the group S; or
    no shingle of m tokens in the shingle of k tokens in the first set is in the group S;
  parsing a second sequence of x tokens into shingles of k tokens, where x is a numerical value and k<=x, and where each of the x tokens has a value from a set of numerical values;
  selecting a second set of shingles of k tokens from the shingles of k tokens parsed from the second sequence of x tokens, where for each of the shingles in the second set:

a shingle of m tokens starting at the offset in the shingle of k tokens in the second set is in the group S; or no shingle of m tokens in the shingle of k tokens in the second set is in the group S; and comparing at least a portion of the first set of shingles of k tokens with at least a portion of the second set of shingles of k tokens.

28. The method of claim 9, wherein a modulo value of a token is a remainder of the numerical value of the token divided by k.

29. A computer-implemented method for selecting shingles, the method comprising:

parsing, by one or more processors, a first sequence of n tokens into shingles of k tokens, where k and n are numerical values and k<=n, and where each of the n tokens has a numerical value; and selecting a first set of shingles of k tokens from the shingles of k tokens parsed from the first sequence of n tokens, where each shingle in the first set includes one of (i) a token in a first position in the shingle having a smallest numerical value of all tokens in the shingle or (ii) a token in a last position in the shingle having the smallest numerical value of all tokens in the shingle;

parsing a second sequence of x tokens into shingles of k tokens, where x is a numerical value and k<=x, and where each of the x tokens has a numerical value;

selecting a second set of shingles of k tokens from the shingles of k tokens parsed from the second sequence of x tokens, where each shingle in the second set includes one of (i) a token in a first position in the shingle having a smallest numerical value of all tokens in the shingle or (ii) a token in a last position in the shingle having the smallest numerical value of all tokens in the shingle; and comparing at least a portion of the first set of shingles of k tokens with at least a portion of the second set of shingles of k tokens.

30. The method of claim 29, further comprising:

receiving the first sequence of n tokens; and selecting the second sequence of x tokens from a data store.

31. The method of claim 29, where the first sequence and the second sequence are respective portions of one sequence.

32. The method of claim 29, further comprising:

evaluating similarity by using the value of k and a number of one or more shingles in the first set that match one or more shingles in the second set.

33. The method of claim 29, where each token in the first sequence is one of a letter, a character, a word, and a string.

34. The method of claim 29, where the numerical value of each token in the first sequence is a number modulo k.

* * * * *

UNITED STATES PATENT AND TRADEMARK OFFICE
CERTIFICATE OF CORRECTION

| | | |
|---|---|---|
| PATENT NO. | : 8,131,751 B1 | Page 1 of 1 |
| APPLICATION NO. | : 12/327368 | |
| DATED | : March 6, 2012 | |
| INVENTOR(S) | : Behshad Behzadi et al. | |

It is certified that error appears in the above-identified patent and that said Letters Patent is hereby corrected as shown below:

Title page, Line 7, Column 2, Under Other Publications, delete "algonthms," and insert -- algorithms --, therefor.

Title page, Line 11, Column 2, Under Other Publications, delete "to al.," and insert -- et al., --, therefor.

Title page, Line 14, Column 2, Under Other Publications, delete "Sahlnap" and insert -- Sahinalp --, therefor.

Title page, Line 14, Column 2, Under Other Publications, delete "Application" and insert -- Applications --, therefor.

Claim 1, Column 13, Line 38, delete "value:" and insert -- value; --, therefor.

Claim 22, Column 15, Line 62, delete "value:" and insert -- value; --, therefor.

Claim 29, Column 19, Line 26, delete "value:" and insert -- value; --, therefor.

Signed and Sealed this
Nineteenth Day of June, 2012

David J. Kappos
*Director of the United States Patent and Trademark Office*